FITZ WILLIAM SARGENT.
BRAKE SHOE.
APPLICATION FILED AUG. 8, 1911.
1,026,928.
Patented May 21, 1912.
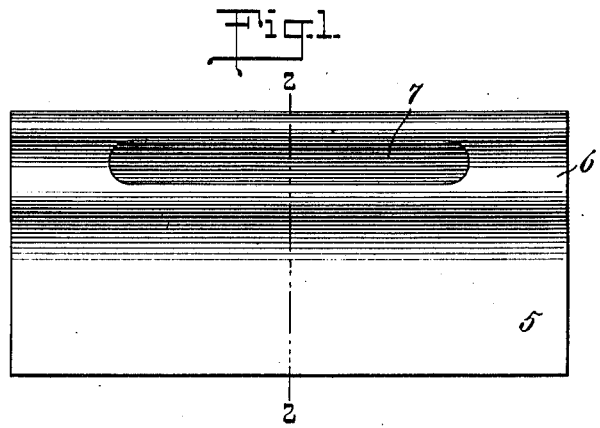
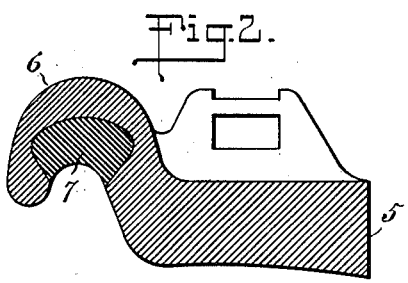
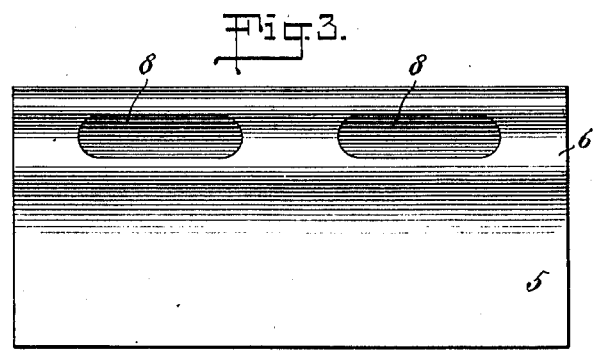
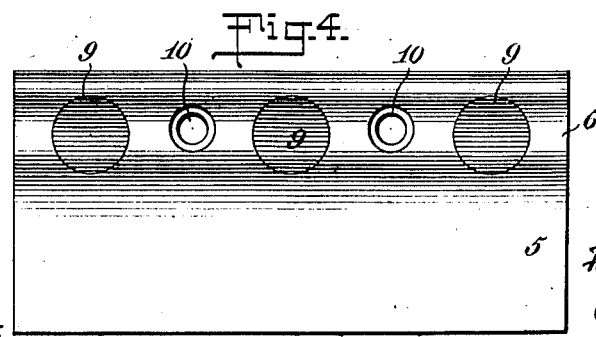

UNITED STATES PATENT OFFICE.

FITZ WILLIAM SARGENT, OF MAHWAH, NEW JERSEY, ASSIGNOR TO EDWARD HUNTINGTON FALLOWS, OF NEW YORK, N. Y.

BRAKE-SHOE.

1,026,928.  Specification of Letters Patent.  Patented May 21, 1912.

Application filed August 8, 1911. Serial No. 643,032.

*To all whom it may concern:*

Be it known that I, FITZ WILLIAM SARGENT, a citizen of the United States, and a resident of Mahwah, in the county of Bergen and State of New Jersey, have made and invented certain new and useful Improvements in Brake-Shoes, of which the following is a specification.

My invention relates to brake shoes of the type having a body portion formed from cast iron and adapted to contact with the tread of a car wheel, and a flange portion adapted to contact with the flange of the wheel, and commonly referred to as a flanged shoe the object of my invention being to provide a shoe which while affording sufficient braking effect will subject the flange portion thereof to less injury than has commonly been met with, and considered incident to the use of brake shoes of the type referred to.

In the use of flanged brake shoes of the kind or style heretofore in use, the comparatively thin flange of the wheel becomes excessively heated when the shoe is applied to the wheel, the effect of such being to injure the flange as by causing cracks to form and develop therein; the object of my invention, more specifically stated, is to provide a brake shoe in which there will be materially less heating of the flange of the wheel and proportionately less injury to the flange, than has heretofore been the case.

In order to secure the results above enumerated, I provide a brake shoe formed preferably from cast iron, having a tread portion adapted to contact with the tread of the wheel, and a flange portion adapted to contact with the flange of the wheel and having one or more recesses or pockets located entirely within said flange portion of the shoe, these pockets being filled with a composition composed principally or entirely of a non-metallic or semi-metallic substance or substances selected and compounded with a view to avoiding as much as possible any grinding action between the flange of the shoe and the wheel flange and an incident generation of heat such as is commonly met with and by reason of which the flange of the wheel becomes highly heated and injured as above explained.

In my improved brake shoe the friction, and consequent braking action, due to contact between the tread of the shoe and that of the wheel is in no way reduced; while the friction between the flange of the shoe and that of the wheel, and the resulting heating effect upon the flange due to such friction, is materially reduced. The flange portion of the shoe, therefore, ceases to contribute materially to the retarding or braking action of the shoe as a whole, and acts chiefly as a guide to retain the shoe in place, the braking action of the shoe being due for the most part to friction generated between the tread portion of the shoe and that of the wheel.

The composition with which the recesses or pockets in the shoe are filled is such as will compact and polish without wearing rapidly away, or being affected by the heat generated; it is preferably composed in part of materials having a high specific heat, as compared with the specific heat of the material from which the shoe is formed, and also possessing lubricating properties so that the composition in addition to being non-grinding in its nature, will also secure a certain amount of lubricating action between the flange of the shoe and the flange of the wheel tending to avoid the heating of the latter.

With the objects above enumerated in view, my invention consists in the improved shoe illustrated in the accompanying drawing, described in the following specification, and particularly claimed in the clauses of the concluding claim, and in such variations and modifications thereof as will be obvious to those skilled in the art to which my invention relates.

In the accompanying drawing wherein the preferred embodiment of my invention is illustrated, Figure 1 is a view showing the wearing face of my improved brake shoe, that is, the face which contacts with the wheel; Fig. 2 is a view showing a section upon a transverse plane indicated by the line 2—2, Fig. 1, and; Figs. 3 and 4 are views similar to Fig. 1, but showing slightly modified forms of my improved shoe.

In the drawing, 5 represents the body portion of my improved brake shoe, adapted to contact with the tread of a car wheel and preferably formed from cast iron in order to secure sufficient friction between the shoe and the car wheel for effective braking action. The shoe is provided with a flange 6 adapted to engage the flange of the wheel, and 7 represents a mass of non-metallic or semi-metallic material located entirely in the flange portion of the shoe, and contained within a recess or pocket provided for its reception therein. The non-metallic material may be in a single mass as shown in Figs. 1 and 2, or it may be divided into two or more bodies as shown at 8 and 9 in Figs. 3 and 4.

In Fig. 4, I have shown pockets filled with a non-metallic material 9, and, in addition, openings 10 extending through the flange portion 6 of the shoe. These openings permit material, worn from the face of the shoe and from the bodies of non-metallic material, to readily escape from between the shoe and the face of the wheel, and provide for a more effective dissipation of the heat generated, forming, as they do, passages through which air may flow, and increasing the radiating surface of the shoe.

My improved brake shoe may be made by first forming a shoe with pockets or recesses in the flange portion thereof, and then introducing the non-metallic substance in the pockets, preferably in plastic form; or the non-metallic substance may be first molded or otherwise shaped into blocks of suitable form and size, then placed in a mold and the molten metal from which the shoe is formed poured therein and about the blocks.

The non-metallic or semi-metallic substance wherewith the recesses in the shoe are filled, may be formed from various materials or ingredients such as graphite, asbestos, pulverized trap rock, fire clay, crushed slag, and similar substances having the properties enumerated, and a higher specific heat than cast iron, said materials being formed into blocks or inserts by means of any suitable binding material. I recommend, however, that the substance wherewith the recesses or pockets are filled be formed from a composition made up of the ingredients mentioned below, as I have obtained better results by using such a composition than with any other material or composition at present known to me.

In case the shoe is formed with recesses, and the non-metallic substance subsequently placed therein in plastic form, I recommend:

| | |
|---|---|
| Fire clay | 1 part |
| Crushed iron ore | 3 parts |
| Iron borings | 3 " |
| Coal tar | 1 part |
| Asphalt | ½ part | the ingredients being first thoroughly mixed and heated to about 112° F. and then pressed into the recesses or pockets.

In case the inserts are to be first formed as blocks to be placed in a mold, and molten cast iron poured about them, I recommend the following composition:

| | |
|---|---|
| Fire clay | 8 parts |
| Crushed slag | 6 " |
| Graphite | 3 " | the ingredients to be first thoroughly mixed and moistened with any suitable liquid so that they will pack, and then formed into blocks of suitable size and shape in molds under a pressure of about fifty tons per square inch.

Having thus described and explained my invention, I claim and desire to secure by Letters Patent:

1. A brake shoe comprising a body portion formed from cast metal and having a continuous metallic surface adapted to contact with the tread of a wheel, and a flange portion adapted to contact with the flange of the wheel; said shoe having a recess or pocket located entirely in the flange portion thereof and filled with a non-metallic substance.

2. A brake shoe comprising a body portion formed from cast metal and having a continuous metallic surface adapted to contact with the tread of a wheel, and a flange portion adapted to contact with the flange of the wheel, said shoe having a recess or pocket located entirely in the flange portion thereof and filled with a non-metallic composition at least one ingredient of which has lubricating properties.

3. A brake shoe comprising a body portion formed from cast metal and having a continuous uniform metallic surface adapted to contact with the tread of a wheel, and a flange portion adapted to contact with the flange of the wheel, said shoe having a recess or pocket located entirely in the flange portion thereof and filled with a non-metallic substance having lubricating properties.

4. A brake shoe comprising a body portion formed from cast iron and having a continuous and uniform metallic surface adapted to contact with the tread of a wheel, and a flange portion adapted to contact with the flange of the wheel; said shoe having a recess or pocket located entirely in the flange portion thereof and filled with a non-metallic substance, and openings extending through said flange portion.

Signed at Mahwah, in the county of Bergen, and State of New Jersey, this 22 day of July, A. D. 1911.

FITZ WILLIAM SARGENT.

Witnesses:
FRANK OSBORN,
W. H. WINTERS.